(12) United States Patent
Roberge et al.

(10) Patent No.: US 10,591,112 B2
(45) Date of Patent: Mar. 17, 2020

(54) PROCESS AND DEVICE FOR FILLING TANKS

(71) Applicant: L'Air Liquide, Societe Anonyme pour l'Etude et l'Exploitation des Procedes Georges Claude, Paris (FR)

(72) Inventors: Guillaume Roberge, Maubec (FR); Guy De Reals, Cyr l'Ecole (FR); Jean-Marie Verghade, Saint Martin d'Uriage (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 69 days.

(21) Appl. No.: 15/558,798

(22) PCT Filed: Feb. 24, 2016

(86) PCT No.: PCT/FR2016/050425
§ 371 (c)(1),
(2) Date: Sep. 15, 2017

(87) PCT Pub. No.: WO2016/146913
PCT Pub. Date: Sep. 22, 2016

(65) Prior Publication Data
US 2018/0073679 A1 Mar. 15, 2018

(30) Foreign Application Priority Data
Mar. 17, 2015 (FR) ...................................... 15 52188

(51) Int. Cl.
*F17C 5/06* (2006.01)
*F17C 7/00* (2006.01)
(Continued)

(52) U.S. Cl.
CPC ................ *F17C 5/06* (2013.01); *F17C 5/007* (2013.01); *F17C 7/00* (2013.01); *F17C 13/025* (2013.01);
(Continued)

(58) Field of Classification Search
CPC .. F17C 5/06; F17C 5/007; F17C 13/04; F17C 13/026; F17C 13/025; F17C 7/00;
(Continued)

(56) References Cited

U.S. PATENT DOCUMENTS 5,211,021 A * 5/1993 Pierson ..................... F17C 5/02
 141/11
5,603,360 A * 2/1997 Teel .......................... F17C 5/06
 137/267
(Continued)

FOREIGN PATENT DOCUMENTS

EP 2 799 757 11/2014
FR 2 919 375 1/2009
(Continued)

OTHER PUBLICATIONS

International Search Report and Written Opinion for PCT/FR2016/050425, dated May 17, 2016.
(Continued)

*Primary Examiner* — Nicolas A Arnett
(74) *Attorney, Agent, or Firm* — Christopher J. Cronin

(57) ABSTRACT

A method for filling tanks with pressurized gas via a filling station comprising several storage containers and a fluid circuit for transferring the gas from the containers to the tanks, the circuit comprising a first end to which the containers are linked in parallel and a second end provided with a transfer line intended to be connected to the tank(s) to be filled, the circuit comprising, arranged in series between the first end and the second end, a first isolation valve, a flow or
(Continued)

pressure regulation member, and a second isolation valve, the method comprising filling a first tank, characterized in that, on completion of the filling of the first tank and before filling a second tank, the first and second isolation valves are closed to trap a supply of pressurized gas in the circuit between said two valves and in that the supply of gas is used to refill at least one of the containers.

11 Claims, 1 Drawing Sheet

(51) Int. Cl.
*F17C 13/02* (2006.01)
*F17C 5/00* (2006.01)
*F17C 13/04* (2006.01)

(52) U.S. Cl.
CPC ............ *F17C 13/026* (2013.01); *F17C 13/04* (2013.01); F17C 2205/0142 (2013.01); F17C 2205/0146 (2013.01); F17C 2205/0326 (2013.01); F17C 2205/0332 (2013.01); F17C 2205/0338 (2013.01); F17C 2221/012 (2013.01); F17C 2223/0123 (2013.01); F17C 2223/036 (2013.01); F17C 2225/0123 (2013.01); F17C 2225/036 (2013.01); F17C 2227/0157 (2013.01); F17C 2227/042 (2013.01); F17C 2227/043 (2013.01); F17C 2227/046 (2013.01); F17C 2250/032 (2013.01); F17C 2250/043 (2013.01); F17C 2250/0439 (2013.01); F17C 2250/0491 (2013.01); F17C 2250/0626 (2013.01); F17C 2250/0636 (2013.01); F17C 2250/0694 (2013.01); F17C 2250/075 (2013.01); F17C 2260/035 (2013.01); F17C 2260/046 (2013.01); F17C 2265/065 (2013.01); F17C 2270/0139 (2013.01); Y02E 60/321 (2013.01)

(58) Field of Classification Search
CPC ........ F17C 2250/0694; F17C 2250/075; F17C 2250/0636; F17C 2250/0626; F17C 2250/0491; F17C 2250/0439; F17C 2250/043; F17C 2250/032; F17C 2227/046; F17C 2227/042; F17C 2227/043; F17C 2227/0157; F17C 2270/0139; F17C 2265/065; F17C 2260/046; F17C 2260/035; F17C 2225/036; F17C 2225/0123; F17C 2223/036; F17C 2223/0123; F17C 2221/012; F17C 2205/0338; F17C 2205/0332; F17C 2205/0326; F17C 2205/0146; F17C 2205/0142; Y02E 60/321

See application file for complete search history.

(56) References Cited

U.S. PATENT DOCUMENTS

| | | | |
|---|---|---|---|
| 5,868,176 A | 2/1999 | Barajas et al. | |
| 7,568,507 B2* | 8/2009 | Farese | F17C 5/06 141/197 |
| 8,281,820 B2* | 10/2012 | White | F17C 5/02 141/37 |
| 8,360,112 B2* | 1/2013 | Allidieres | F17C 5/007 141/102 |
| 9,541,236 B2* | 1/2017 | Kuehl | F17C 5/06 |
| 9,618,158 B2* | 4/2017 | Killeen | F17D 3/00 |
| 10,240,721 B2* | 3/2019 | Dawson | F17C 5/06 |
| 2003/0209282 A1 | 11/2003 | Satou et al. | |
| 2004/0163731 A1* | 8/2004 | Eichelberger | B60S 5/02 141/284 |
| 2005/0178463 A1 | 8/2005 | Kountz et al. | |
| 2006/0016512 A1 | 1/2006 | Takano et al. | |
| 2007/0051423 A1 | 3/2007 | Handa | |
| 2007/0257043 A1 | 11/2007 | Kanoya et al. | |
| 2010/0193070 A1 | 8/2010 | Allidieres | |
| 2010/0307636 A1 | 12/2010 | Uemura | |
| 2012/0227864 A1 | 9/2012 | Mori | |
| 2014/0130938 A1* | 5/2014 | Luparello | F17C 5/007 141/69 |
| 2014/0196815 A1* | 7/2014 | Allidieres | F17C 5/06 141/82 |
| 2014/0263420 A1 | 9/2014 | Lambrix et al. | |
| 2017/0067600 A1* | 3/2017 | Poorman | F17C 5/06 |
| 2018/0066799 A1* | 3/2018 | Ravinel | F17C 5/007 |
| 2018/0347761 A1* | 12/2018 | Lacombe | F17C 5/06 |

FOREIGN PATENT DOCUMENTS

| | | |
|---|---|---|
| FR | 2 928 716 | 9/2009 |
| JP | 2007 239 956 | 9/2007 |
| WO | WO 2011/049466 | 4/2011 |
| WO | WO 2014/082709 | 6/2014 |
| WO | WO 2015/001208 | 1/2015 |

OTHER PUBLICATIONS

French Search Report and Written Opinion for FR 1552188, dated Jan. 7, 2016.
International Search Report and Written Opinion for PCT/FR2016/050424, dated May 25, 2016.
French Search Report and Written Opinion for FR 1552189, dated Jan. 8, 2016.

* cited by examiner

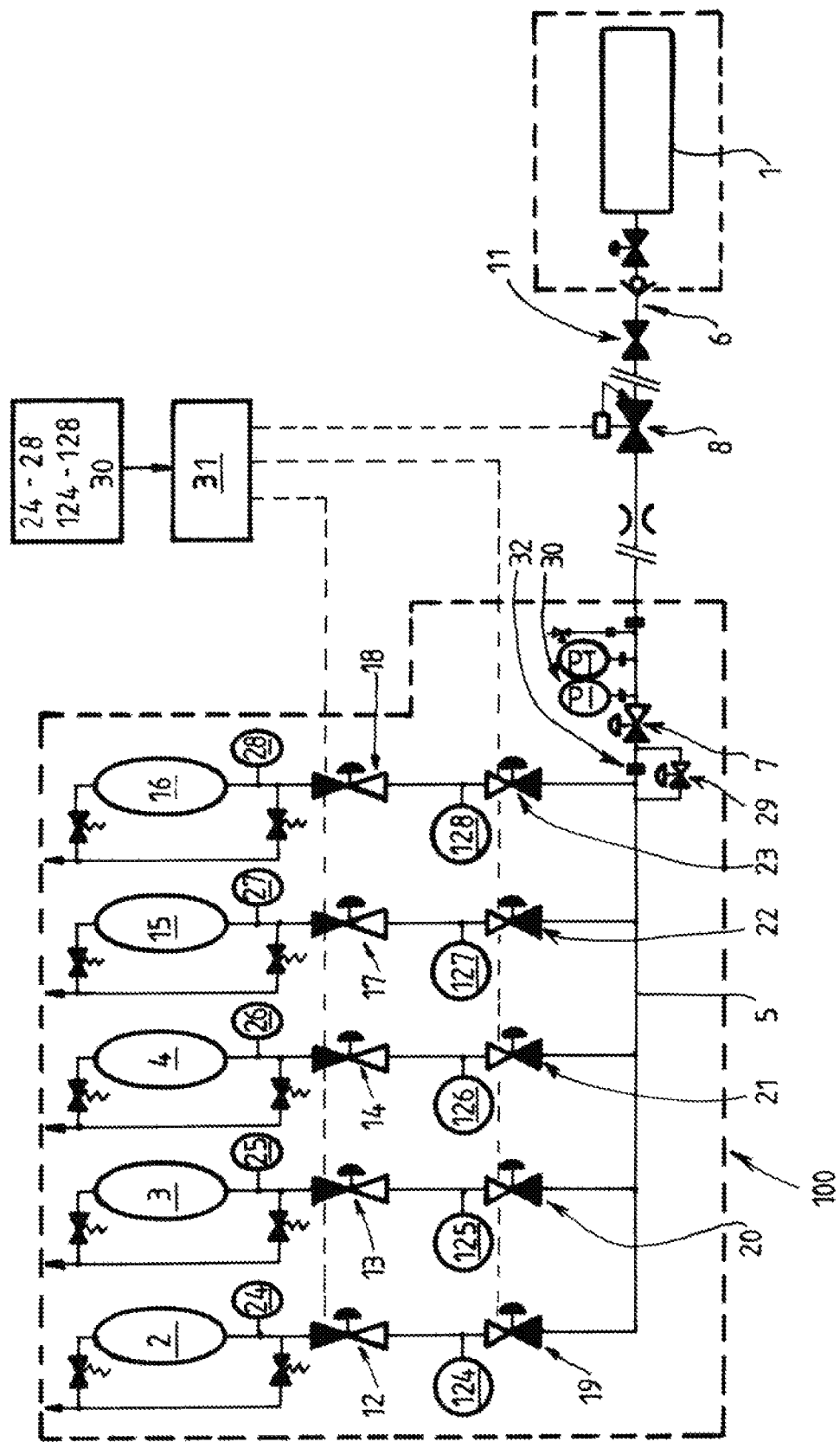

PROCESS AND DEVICE FOR FILLING TANKS

CROSS-REFERENCE TO RELATED APPLICATIONS

This application is a § 371 of International PCT Application PCT/FR2016/050425, filed Feb. 24, 2016, which claims § 119(a) foreign priority to French patent application FR1552188, filed Mar. 17, 2015.

BACKGROUND

Field of the Invention

The present invention relates to a method and a device for filling tanks with pressurized gas.

The invention relates more particularly to a method for filling tanks with pressurized gas, notably pressurized hydrogen, via a filling station comprising several containers for storing gas under pressure and a fluidic circuit for transferring the gas from the containers to the tanks by pressure equalizing, the circuit comprising a first end to which the containers are connected in parallel, and a second end equipped with a transfer pipe intended to be connected removably to the tank(s) for filling, the circuit comprising, arranged in series between the first end and the second end, a first isolation valve, a flow or pressure regulating member, and a second isolation valve, the method comprising a filling of a first tank.

The invention advantageously applies to the rapid (in a few minutes) filling of tanks with hydrogen under pressure (of between 200 and 1000 bar for example). The invention notably applies to the filling of vehicle fuel tanks.

Related Art

When a hydrogen tank is being filled with gas under pressure, the compression of the gas in the tank causes heating that may exceed the operational limits of the tank materials.

In order to optimize these fillings, one known technique is to fill the tanks "in cascade", namely by successive pressure equalizing operations between the tank for filling and containers of pressurized gas at increasing pressure. This filling may also be supplemented and/or assisted by a compressor. The gas may also be cooled during the filling.

Documents FR2928716A1 and FR2919375A1 describe two nonlimiting examples of such filling methods.

Document WO2011/049466A1 describes a filling station using gas from the circuit to perform leak tests.

There is on-going interest in improving the efficiency and costs of such filling stations.

SUMMARY OF THE INVENTION

It is an object of the present invention to alleviate all or some of the abovementioned disadvantages of the prior art.

To this end, in accordance with the generic definition given thereof in the above preamble, at the end of the filling of the first tank and before the filling of a second tank, the first and the second isolation valves are closed in order to trap a reserve of gas under pressure in the circuit (5) between these two valves, and in that the reserve of gas is used to re-fill the at least one of the containers.

This use for re-filling a container notably comprises a transfer of this gas from the reserve into at least one container, which means to say that the appropriate valve or valves of the circuit are open, notably the first valve.

This use of the gas for re-filling at least one container is preferably performed after the pressure in the circuit (notably between these two valves) and/or in the container or containers has been determined (for example measured).

The present invention proposes an arrangement and/or a use of the filling devices that allows an improvement in the efficiency of the fillings.

Specifically, at the end of a completed filling operation, instead of discharging the gas present in the lines of the filling circuit (for example discharging to the atmosphere), the invention keeps this gas under pressure to return it to the source containers.

Moreover, some embodiments of the invention may comprise one or more of the following features:

- the reserve of gas is used to fill the at least one of the containers by pressure equalizing,
- the reserve of gas is used to fill several containers by successive pressure equalizing operations, the containers being filled successively in decreasing pressure order, which means to say by equalizing the reserve of gas first of all with the container having the highest pressure lower than the pressure of the reserve of gas, then by equalizing the reserve of gas next with another container having a lower pressure not as high as the pressure of the reserve of gas, finishing by equalizing the pressure between the reserve of gas and the container having the least high pressure lower than the pressure of the reserve of gas,
- the method comprises pressure measurements within the reserve of gas and within the containers, the successive pressure equalizing operations are performed in response to said pressure measurements,
- gas trapped between the two isolation valves is under temperature and pressure conditions that correspond to the last phase of filling of the first tank,
- the gas trapped between the two isolation valves has a pressure comprised between 200 and 1000 bar and preferably comprised between 400 and 700 bar and a temperature comprised between −40° C. and +85° C. (depending, for example, on the rate of withdrawal of the gas, the number of tanks filled, the ambient temperature, etc.) and preferably comprised between ambient temperature increased by 20° C. and ambient temperature minus 20° C.,
- the first isolation valve is positioned near the first end of the circuit, which means to say that the first isolation valve is closer to the first end of the circuit than to the second end of the circuit,
- the second isolation valve is positioned near the second end of the circuit, which means to say that the second isolation valve is closer to the second end of the circuit than to the first end of the circuit,
- the volume of the circuit situated between the first and second isolation valves is comprised between three and fifty liters,
- the length of the circuit between the first and second isolation valves is comprised between one meter and five hundred meters and preferably comprised between one and one hundred meters,
- at least between the first and second isolation valves the circuit comprises one or more pipes comprising thermal insulation.

The invention also relates to a device for filling tanks with pressurized gas, notably pressurized hydrogen, comprising a filling station comprising several containers for storing gas under pressure connected in parallel, via a set of respective valves, to the first end of a fluidic circuit for transferring the gas from the containers to the tanks, the circuit comprising a second end equipped with a transfer pipe intended to be connected removably to the tank(s) for filling, the circuit comprising, arranged in series between the first end and the second end, a first isolation valve, a flow or pressure regulating member, and a second isolation valve, the circuit comprising a set of sensors for measuring the pressure in the containers and in the circuit, the device comprising an electronic member for the storage, acquisition and processing of data connected to the sensors and to the valves in order to govern the opening of the valves as a function of the pressure measurements from the sensors to control the valves so as to perform filling of (the) reservoir(s) by successive equalizings of pressure with the containers, characterized in that the electronic member for the storage, acquisition and processing of connected data is configured, at the end of the filling of a first tank and before the filling of a second tank, to command the closing of the first and second isolation valves so as to trap a reserve of gas under pressure in the circuit between these two valves and to use this reserve of gas to re-fill the at least one of the containers.

According to other possible specific features, the electronic member for the storage, acquisition and processing of connected data is configured to re-fill several containers with the reserve of gas by successive pressure equalizing operations in decreasing pressure order, namely by equalizing the reserve of gas first of all with the container having the highest pressure lower than the pressure of the reserve of gas, then by equalizing the reserve of gas next with another container having a pressure that is lower but higher than the pressure of the reserve of gas, finishing by equalizing the pressure between the reserve of gas and the container having the least high pressure lower than the pressure of the reserve of gas.

The invention may also relate to any alternative device or method comprising any combination of the features above or below.

Other specifics and advantages will become apparent from reading the description hereinafter, given with reference to the single figure which schematically and partially depicts one example of a gas filling station that can implement the invention.

BRIEF DESCRIPTION OF THE FIGURES

FIG. 1 is a schematic of an embodiment of the device.

DETAILED DESCRIPTION OF THE INVENTION

The device for filling tanks 1 with pressurized gas, notably pressurized hydrogen, illustrated in FIG. 1, comprises several containers 2, 3, 4, 15, 16 for the storage of gas under pressure which are connected in parallel, via a set of respective valves 12, 13, 14, 17, 18, 19, 20, 21, 22, 23, to the first end of a fluidic circuit 5 for transferring the gas from the containers to the tanks 1 for filling. The containers 2, 3, 4, 15, 16 store gas (hydrogen for example) under pressure at determined different pressures for example between 100 and 1000 bar.

The circuit 5 in particular comprises at least one fluidic pipe.

In the example depicted, five containers 2, 3, 4, 15, 16 are connected in parallel to the first end of the filling circuit 5. For example, each container 2, 3, 4, 15, 16 is connected to the first end of the circuit 5 via two respective valves arranged in series.

In the conventional way, each container 2, 3, 4, 15, 16 may be fitted with a respective sensor 124, 125, 126, 127, 128 for measuring the pressure within the container.

As depicted, each pressure sensor 124 to 128 may be situated on the circuit 5 between the two valves in series which are connected to each container.

The two valves in series at the outlet of each container 2, 3, 4, 15, 16 may be automatic valves used in a "top-to-toe" manner. These valves may be of the type operated by an electromagnet (for example valves allowing passage in the downstream—upstream direction, if the downstream pressure is higher than the upstream pressure). In the case, for example, where one of the valves seals in both directions of flow, one of the two valves in series may be omitted.

Likewise, each container 2, 3, 4, 15, 16 may comprise a respective temperature sensor 24 to 28 for measuring the temperature of the container and/or of the gas in the container. In addition, likewise in the conventional way, each container 2, 3, 4, 15, 16 may comprise a safety device for discharging the contents in the event of overpressure or overheating depending on the type of cylinder (pressure-sensitive and/or temperature-sensitive relief valve).

Downstream (toward the second end), the circuit 5 may comprise for example: a first isolation valve 7, pressure (and possibly temperature sensors 30, a calibrated orifice, a pressure and/or flow regulating valve 8 and a second isolation valve 11.

The set of sensor(s) may notably directly or indirectly measure the pressure in the circuit between the first 7 and second 11 valves.

Downstream, the circuit may comprise a flexible hose equipped with a coupling intended to be connected in a sealed manner to the tank 1 for filling.

The circuit 5 may comprise an electronic member 31 for control, storage, acquisition and processing of data connected to the sensors and to the valves so as to govern the opening of the valves according to the pressure measurements from the sensors.

The electronic member 31 may comprise a computer, a microprocessor, a processor or any suitable electronic logic.

Conventionally, the control member 31 is configured (programmed or programmable) to be able to perform a filling of (the) tank(s) 1 by successive operations of equalizing pressure with the containers 2, 3, 4, 15, 16 (filling of the "cascade" type).

According to one advantageous particular feature, the control member 31 is also configured, at the end of the filling of a first tank 1 and before the filling of a following second tank, to command the closing of the first and second isolation valves 7, 11 in order to trap a reserve of gas under pressure in the circuit 5 between these two valves 7, 11 and to use this reserve of gas to return this gas to the containers 2, 3, 4, 15, 16.

What this means to say is that the residual gas from the circuit which is at the conditions (notably pressure conditions) of the last filling phase (last pressure equalizing operation) can be used to fill the container or containers 2, 3, 4, 15, 16 by pressure equalizing. The gas in the reserve is trapped at the end of filling, for example at the conditions of the last few moments or seconds of filling.

For preference, the reserve of gas is used for filling several containers 2, 3, 4, 15, 16 by successive pressure equalizing operations. The containers 2, 3, 4, 15, 16 are, for example, filled successively in decreasing pressure order, which means to say by equalizing the reserve of gas first of all with the container 2, 3, 4, 15, 16 having the highest pressure lower than the pressure of the reserve of gas, then by equalizing the reserve of gas next with another container having a lower pressure not as high as the pressure of the reserve of gas, etc., finishing by equalizing the pressure between the reserve of gas and the container having the least high pressure lower than the pressure of the reserve of gas. When there are only two containers, filling ends on completion of the equalizing of pressure between the reserve and the second container (the latter having a pressure that is not as high and lower than the pressure of the reserve).

The successive pressure equalizing operations are performed for example automatically in response to said pressure measurements of pressure 30, 124 to 128 within the reserve of gas and within the containers 2, 3, 4, 15, 16.

Depending on the features of the station, the gas trapped between the circuit may have a pressure comprised between 200 and 1000 bar and preferably comprised between 400 and 700 bar and a temperature comprised between −40° C. and +85° C. (depending, for example, on the rate of withdrawal of the gas, the number of tanks filled, the ambient temperature, etc.) and preferably comprised between the ambient temperature increased by 20° C. and the ambient temperature minus 20° C.

The volume of the circuit situated between the first 7 and second 11 isolation valves may be comprised between three and fifty liters. For example, the length of the circuit 5 (pipe(s) between the first 7 and second 11 isolation valves may be comprised between one meter and several hundreds of meters and preferably comprised between one and one hundred meters.

While having a structure that is simple and inexpensive, the invention makes it possible to increase the level of use of the containers of gas under pressure.

Specifically, this solution requires no structural modifications to stations of the prior art (valves and the pressure sensors are already present on the installation). Only the programing or use of the station needs to be modified (for the gas to flow in the opposite direction).

As depicted, an additional automatic valve 29 may be arranged in a bypass running parallel with a residual pressure valve 32 in the circuit 5 so as to allow the "reverse cascade" and to place the containers at atmospheric pressure for maintenance purpose.

In addition, the coupling for connecting each container needs to allow flow to pass in both directions for filling and withdrawing.

The inventors demonstrated that the increases in efficiency are significant (up to 20% increase in the level of usage of the gas of the containers).

Specifically, this method makes it possible to increase the level of usage of the containers, namely to increase the quantity of gas transferred to the vehicle tanks by making it possible to increase the number of completely full fillings (which means to say a level of filling of the vehicle greater than 95% for example).

In addition, the invention makes it possible to reduce the changeovers of source containers (control of a set of full containers). Specifically, the invention makes it possible to avoid premature container changeover by using these containers more completely.

This makes it possible to reduce the overall cost.

The invention can be applied to any fixed or mobile filling station and in particular to any station using mobile trailers of containers under pressure (pressures comprised between 200 bar and 700 bar for example for multi-compartment trailers).

For example, the assembly surrounded by dotted line in the right-hand part of the figure (containers and valves, etc.) may constitute the gas supply, for example attached to a mobile semitrailer. The entity surrounded by dotted lines on the left of the figure may typically be the mobile tank that is to be filled, for example attached to a vehicle. Finally, the part between these two entities (the line with the regulating member 8 and calibrated orifice if appropriate, etc.) may be installed at a depot, for example to form the relatively fixed part of the filling station.

The station may comprise a compressor used for the fillings of the tanks or of the containers (to supplement or complete these fillings). In particular, the gas in the reserve may act as a source of gas for the compressor.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for filling tank(s) with pressurized gas via a filling station, comprising the steps of:
providing several containers for storing gas under pressure and a fluidic circuit for transferring the gas from the containers to the tank(s) by pressure equalizing, the circuit comprising a first end to which the containers are connected in parallel and a second end equipped with a transfer pipe intended to be removably connected to the tank(s) for filling, the circuit comprising, and being arranged in series between the first end and the second end, a first isolation valve, a flow or pressure regulating member, and a second isolation valve;

filling a first tank with the pressurized gas from the transfer pipe;

filling a second tank with the pressurized gas from the transfer pipe, wherein at an end of the filling of the first tank and before the filling of a second tank, the first and the second isolation valves are closed in order to trap a reserve of gas under pressure in the circuit between the first and second isolation valves; and using the trapped reserve of gas to fill at least one of the containers.

2. The method of claim 1, wherein the reserve of gas is used to fill at least one of the containers by pressure equalizing.

3. The method of claim 1, wherein the reserve of gas is used to fill a plurality of the several containers by successive pressure equalizing operations, the containers being filled successively in decreasing pressure order by equalizing the reserve of gas first with the container having the highest pressure lower than the pressure of the reserve of gas and then by equalizing the reserve of gas with another container having a lower pressure not as high as the pressure of the reserve of gas, the filling of the several containers being finishing by equalizing the pressure between the reserve of gas and the container having the least high pressure lower than the pressure of the reserve of gas.

4. The method of claim 3, further comprising the steps of: measuring the pressure of the trapped reserve of gas; and measuring the pressure of the pressurized gas in the containers, wherein the successive pressure equalizing operations are performed in response to said pressure measurements.

5. The method of claim 1, wherein the trapped reserve of gas between the two isolation valves is under temperature and pressure conditions the same as those of the container used in a last phase of filling of the first tank.

6. The method of claim 1, wherein the trapped reserve of gas between the two isolation valves has a pressure between 200 and 1000 bar and a temperature between $-40°$ C. and $+85°$ C.

7. The method of claim 1, wherein the first isolation valve is positioned closer to the first end of the circuit than to the second end of the circuit.

8. The method of claim 7, wherein the second isolation valve is positioned closer to the second end of the circuit than to the first end of the circuit.

9. The method of claim 1, wherein a volume of the circuit between the first and second isolation valves is between three and fifty liters.

10. The method of claim 1, wherein a length of the circuit between the first and second isolation valves is between one meter and five hundred meters.

11. The method of claim 1, wherein the pressurized gas is hydrogen.

* * * * *